US009984057B2

(12) United States Patent
Miller et al.

(10) Patent No.: US 9,984,057 B2
(45) Date of Patent: May 29, 2018

(54) CREATING NOTES RELATED TO COMMUNICATIONS

(71) Applicant: MICROSOFT TECHNOLOGY LICENSING, LLC, Redmond, WA (US)

(72) Inventors: Robert Miller, Bellevue, WA (US); Tali Roth, Seattle, WA (US); Ned Bearer Friend, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 182 days.

(21) Appl. No.: 14/970,565

(22) Filed: Dec. 16, 2015

(65) Prior Publication Data

US 2017/0177555 A1    Jun. 22, 2017

(51) Int. Cl.
| | | |
|---|---|---|
| G06F 17/24 | (2006.01) | |
| H04L 12/58 | (2006.01) | |
| G06F 17/21 | (2006.01) | |
| G06F 7/08 | (2006.01) | |
| G06F 3/0484 | (2013.01) | |
| G06F 3/0482 | (2013.01) | |
| G06F 3/0488 | (2013.01) | |
| G06F 3/01 | (2006.01) | |
| G06F 3/0346 | (2013.01) | |
| G06F 3/0354 | (2013.01) | |
| G06F 3/0489 | (2013.01) | |

(52) U.S. Cl.
CPC ............ *G06F 17/241* (2013.01); *G06F 3/017* (2013.01); *G06F 3/0346* (2013.01); *G06F 3/03543* (2013.01); *G06F 3/03545* (2013.01); *G06F 3/0482* (2013.01); *G06F 3/0489* (2013.01); *G06F 3/04842* (2013.01); *G06F 3/04845* (2013.01); *G06F 3/04883* (2013.01); *G06F 7/08* (2013.01); *G06F 17/211* (2013.01); *H04L 51/10* (2013.01)

(58) Field of Classification Search
None
See application file for complete search history.

(56) References Cited

U.S. PATENT DOCUMENTS

| | | |
|---|---|---|
| 7,089,287 B2 | 8/2006 | Bellotti et al. |
| 2001/0029175 A1 | 10/2001 | Sellen et al. |
| 2007/0130369 A1 | 6/2007 | Nayak |

(Continued)

OTHER PUBLICATIONS

Clark, Matt, "Google Inbox: What Works and What Doesn't in the New Email App", Published on: Nov. 10, 2014, Available at: http://in.ign.com/tech/70345/feature/google-inbox-what-works-and-what-doesnt-in-the-new.

(Continued)

*Primary Examiner* — Asher Kells
(74) *Attorney, Agent, or Firm* — Turk IP Law, LLC

(57) ABSTRACT

Creating notes related to communications may be provided. In some examples, an application, such as a communication management application, may display the communications. The communication management may detect an input to generate a note related to a communication and may provide a note interface to capture the note. The note may be captured on the note interface. The note may be saved as a related communication associated with the communication. The communication management application may display the related communication.

19 Claims, 9 Drawing Sheets

(56) References Cited

U.S. PATENT DOCUMENTS

| | | | |
|---|---|---|---|
| 2007/0239831 A1* | 10/2007 | Basu | G06F 3/0483 709/206 |
| 2009/0125597 A1* | 5/2009 | Carr | H04L 51/34 709/206 |
| 2009/0222741 A1 | 9/2009 | Shaw et al. | |
| 2010/0070880 A1* | 3/2010 | Chinta | G06Q 10/107 715/752 |
| 2010/0191736 A1 | 7/2010 | Witkowski et al. | |
| 2013/0246912 A1 | 9/2013 | Siu | |
| 2014/0082521 A1 | 3/2014 | Carolan et al. | |
| 2014/0143683 A1 | 5/2014 | Underwood et al. | |
| 2014/0337751 A1 | 11/2014 | Lim et al. | |
| 2015/0106741 A1 | 4/2015 | Friend et al. | |
| 2015/0143258 A1 | 5/2015 | Carolan et al. | |
| 2015/0271128 A1* | 9/2015 | Mantey | H04L 51/36 715/752 |

OTHER PUBLICATIONS

"Right Inbox Knowledgebase", Published on: Sep. 20, 2012, Available at: http://www.rightinbox.com/support.

Chan, Christine, "Get a Handle on your Priorities with this All-in-One Productivity App", Published on: Jan. 26, 2015, Available at: http://appadvice.com/review/handle-todos-email-calendar.

Parikh, et al., "Inbox Zero is Finally Possible", Retrieved on: Sep. 30, 2015, Available at: https://todoist.com/gmail.

"Google Mail—Create a Task List from Your Inboxlink", Published on: Jul. 3, 2014, Available at: https://www.everettcc.edu/files/administration/college-services/information-technology/google/gmail-tasklist.pdf.

"Break free from your Inbox", Published on: Dec. 22, 2014, Available at: http://www.sortd.com/.

Raphael, Jr, "Six weeks with Google's Inbox—and why it's back to Gmail for me", Published on: Dec. 4, 2014, Available at: http://www.computerworld.com/article/2854852/mobile-wireless/google-inbox-revisited.html.

"International Search Report and Written Opinion Issued in PCT Application No. PCT/US2016/065475", dated Mar. 14, 2017, 12 Pages.

"Second Written Opinion Issued in PCT Application No. PCT/US2016/065475", dated Jun. 29, 2017, 4 Pages.

"International Preliminary Report on Patentability Issued in PCT Application No. PCT/US2016/065475", dated Sep. 27, 2017, 9 Pages.

* cited by examiner

CREATING NOTES RELATED TO COMMUNICATIONS

BACKGROUND

Email applications are widely utilized on a variety of client devices for correspondence. With the proliferation of computing and networking technologies, email use has become an inextricable part of daily personal and professional lives. Problems of how to prioritize/sort the emails and how to quickly recall information related to an email still remains. Some emails may be important to a user as they may be related to work and personal matters, while other emails may be relatively unimportant such as recreational and entertainment emails, or sent simply as a courtesy copy. The user may wish to capture an idea quickly related to one of the work-related emails, for example. To do so, the user may create sticky notes and/or start a draft communication (e.g. a draft email). However, the user may be unable to locate the sticky note when needed. Further, drafting the communication or the email may be time consuming, as the user may perform several input actions to convey their thought.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to creating notes related to communications. In some examples, an application, such as a communication management application, may display communications. The communication management application may detect an input to generate a note related to a communication from the communications and may provide a note interface to capture the note. The note may be captured on the note interface. The note may be saved as a related communication associated with the communication. The communication management application may display the related communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
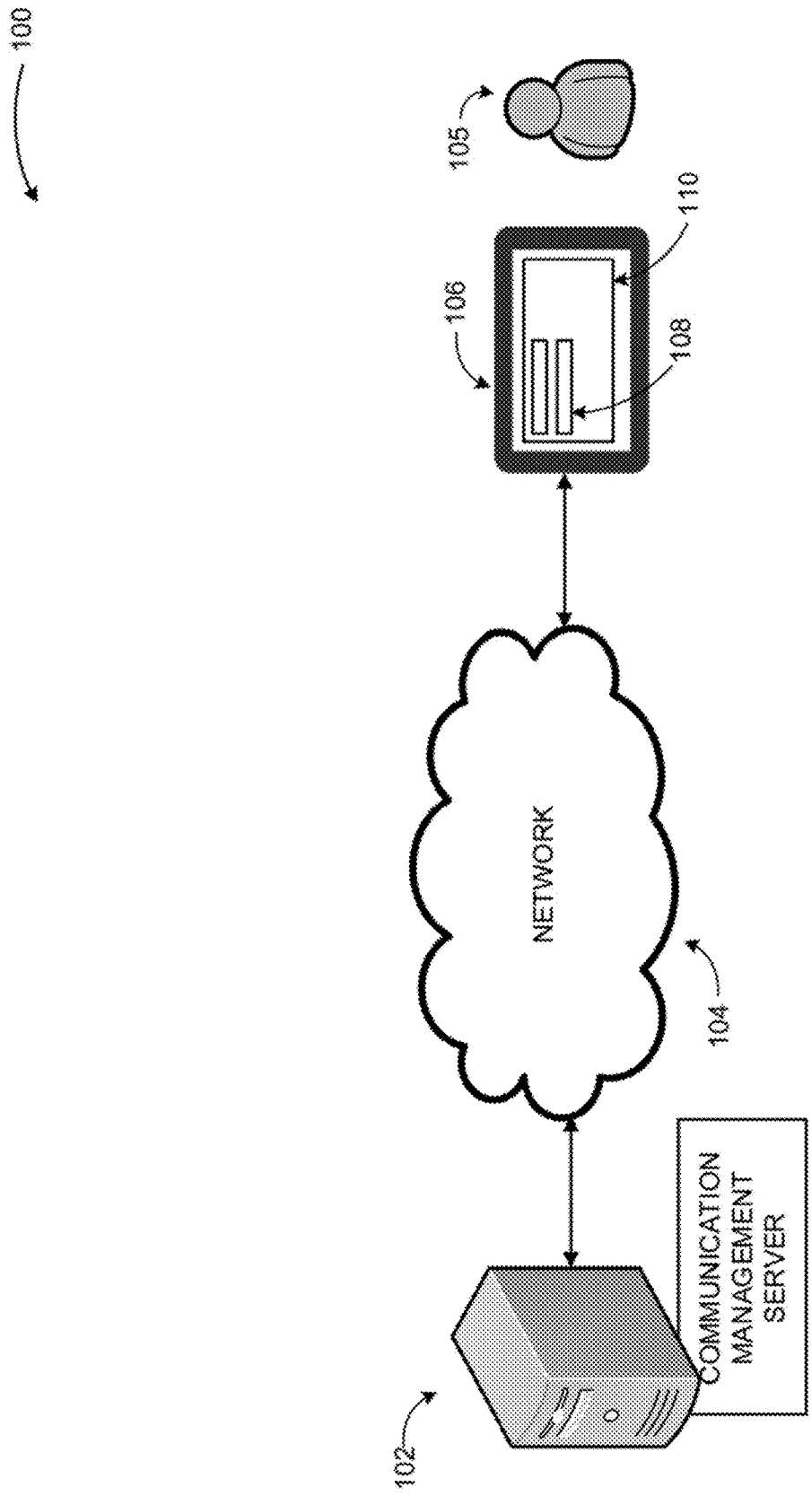
FIG. 1 is a conceptual diagram illustrating an example computing environment for creating notes related to communications, according to embodiments.

As briefly described above, creating notes related to communications may be provided. In some examples, an application, such as a communication management application, may display the communications. The communication management application may detect an input to generate a note related to a communication and may provide a note interface to capture the note. The note may be captured on the note interface. The note may be saved as a related communication associated with the communication. The communication management application may display the related communication.

The communication management application may present information associated with the related communication. The information includes textual information, animation information, audio information, metadata, and graphical information associated with a deadline and/or an attachment of the related communication. The information may be distinguished with a textual scheme, a graphical scheme, an audio scheme, an animation scheme, a coloring scheme, a highlighting scheme, and/or a shading scheme, among others. In some examples, the communication management application may detect a modification of the related communication. The modification may include an edit applied to the deadline and/or an edit applied to the attachment. The modification may be saved.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for creating notes related to communications. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using communications herein, embodiments are not limited to communications. Creating notes related to communications may be implemented in other environments, such as instant messages, data sharing, application sharing, online conferencing, and similar communications, where communication data may be exchanged.

The technical advantages of creating notes related to communications may include, among others, increased efficiency of stakeholder interactions with communications through note presentation. Furthermore, an association between notes and the communications may be maintained in response to actions performed on the notes. For example, if a first note associated with a communication is edited and moved, the first note will be moved in relation to the move of the communication. The association between notes and the communications may be beneficial if the stakeholder wishes to recall the note, but is unable to quickly locate it. Processing and network bandwidth usage may also be reduced by avoiding repeated communications. Establishment of an association between notes and communications may also be optimized through comparison of attributes associated with the notes to attributes associated with the communications, resulting in reduced memory and processor burden.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with the communications.

FIG. 1 is a conceptual diagram illustrating an example computing environment for creating notes related to communications, according to embodiments.

As shown in a diagram 100, a computing device 106 may execute a communication management application 108. The communication management application 108 may receive communications from a communication management server 102. The communications may include emails, online calendar invites, attachments associated with the emails, and/or text messages, among others. The communication management application 108 may analyze the communications and may present various aspects of the communications, such as attributes, schedules, resource allocations, and similar ones using visual tools like Gantt charts, calendars, tables, and comparable ones. The computing device 106 may include a display device, such as a touch enabled display component, and a monitor, among others, to provide the communication management application 108 to a stakeholder 105. The computing device 106 may include a desktop computer, a laptop computer, a tablet, a smart phone, and a wearable computer, among other similar computing devices, for example.

In some examples, the communication management application 108 may be executed on the communication management server 102. The communication management server 102 may include a web server or a document server, among others. The computing device 106 may communicate with the communication management server 102 through a network 104. The network 104 may provide wired or wireless communications between nodes, such as the computing device 106 or the communication management server 102.

In other examples, the communication management application 108 may be provided by a third party service, web applications, and/or a datacenter, among others. Local access to the communication management application 108 may be provided by locally installed rich clients (a local version of the communication management application 108) or generic applications, such as a browser on the computing device 106. The communication management application 108 executed on the communication management server 102 represents a visual way to view and the communications.

The communication management application 108 may display, on the display device, the communications. The display device may be used to present the communications employing a grid of columns reflecting the state of a given communication (e.g., received today, received yesterday, not responded to, responded to, etc.) and rows representing aggregations of the communications (summary communications). The communications may be represented by graphical objects, textual objects, or a combination of the graphical objects and the textual objects on the grid. The communication management application 108 may implement various graphical, textual, coloring, shading, and similar schemes to emphasize different aspects of the statuses of the communications, the communications, attributes associated with the communications, resources associated with the communications, and information associated with the communications, among other properties.

The communication management application 108 may detect an input, from the stakeholder 105, to generate a note related to a communication from the communications. The communication management application 108 may provide, on the display device, a note interface 110 to capture the note. The communication management application 108 may capture the note on the note interface 110 and may save the note as another communication related to the communication.

In some examples, the communications and the information, the attributes, and the resources associated with the communications may be presented on the note interface 110 of the computing device 106. Furthermore, conventional and intrinsic communication management fields may be used for automatic placement of the communications into appropriate columns on the note interface 110.

While the example system in FIG. 1 has been described with specific components including the computing device 106, the communication management application 108, and the communication management server 102, embodiments are not limited to these components or system configurations and can be implemented with other system configuration employing fewer or additional components.

Figure 2:
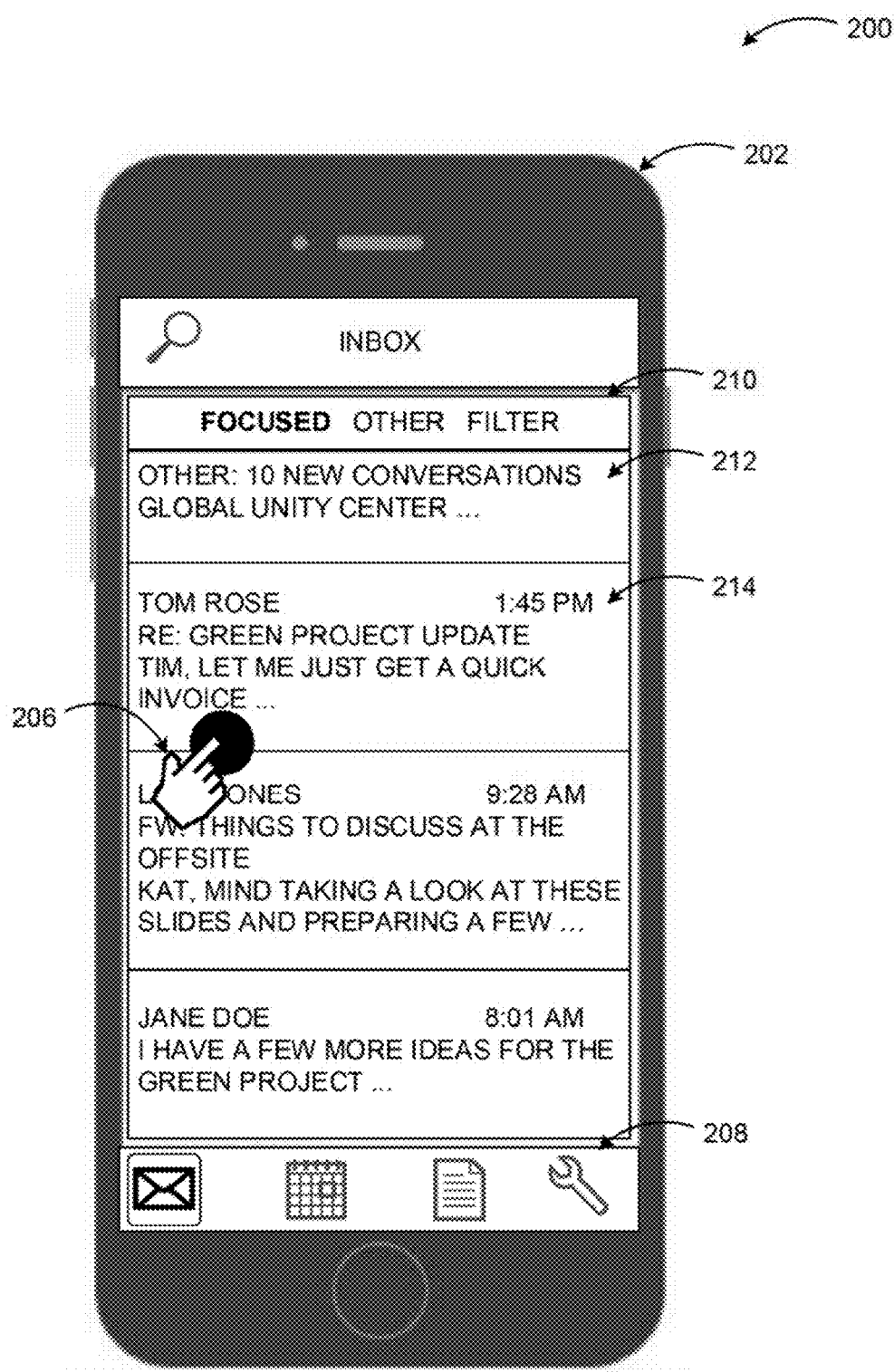
FIG. 2 is a conceptual diagram illustrating an example note interface for capturing notes related to communications, according to embodiments.

FIG. 2 is a conceptual diagram illustrating an example note interface for capturing notes related to communications, according to embodiments.

In a diagram 200, a computing device 202 may include a display device and a monitor, among others, to provide the communication management application 210 to a stakeholder. The communication management application 210 may include a rendering engine and a note-editing engine. The communication management application 210 may retrieve a communication 212 and another communication 214 from a communication management server. In other examples, the communication management application 210 may retrieve the communication 212 and the other communication 214 from a communications data store hosted by a communication management server.

In other examples, the communication management application 210 may retrieve the communication 212 and the other communication 214 from the communication management server. The communication management application 210 may also import attributes, resources, and information associated with the communication 212 and the other communication 214, among other properties.

In examples, the communication management application 210 may perform a verification process during the association of the other communication 214 to the communication 212. In response to an execution of the verification process, the communication management application 210 may determine the other communication 214 as having attributes related to attributes of the communication 212 and may associate the other communication 214 with the communication 212. If the communication management application 210 determines, based on the verification process, that the other communication 214 does not meet predefined qualifications needed to be associated with the communication 212, the communication management application 210 may transmit an alert to the display device. The alert may inform the stakeholder that the other communication 214 cannot be associated with the communication 212. The alert may include an audio alert, a visual alert, a tactile alert, and a textual alert, among others.

In some examples, the communication management application 210 may identify the communication 212 and the other communication 214 from resources received from the communications data store. The resources may include an identity of the stakeholder performing the task, a physical resource performing the task, and a virtual resource performing the task, among others. The communication management application 210 may also enable the stakeholder to utilize the display device to search for an additional communication. If the additional communication is identified, the communication management application 210 may collect and import the additional communication, communication data associated with the additional communications, and attributes associated with the additional communication.

In a system according to embodiments, application functionality may remain enabled such that the stakeholder may access and control the communication 212 and the other communication 214, the information, the attributes, and the tasks. In examples, the communication management application 210 may include controls 208 (graphical and/or textual control elements) to allow the stakeholder to perform actions on a selected communication (e.g. the communication 212). The actions may include editing, copying, and scheduling of the resources, association of attributes, and information associated with the selected communication. In some examples, the actions may include enrichment actions to augment the selected communication. The enrichment actions may include, for example, the addition of a graphic, an audio file, a video file, a textual file, a hashtag, a label, a color, a priority, and a reminder, among others, to the selected communication. Further, the enrichment actions may be detected by input gestures (e.g. a quick action, a swipe action, and a press and hold action, etc.) during the creation of the communication 212 and/or after the communication 212 has been created. As updates and modifications are made to the communication 212 and the other communication 214, the communication 212, the other communication 214, the information, and the attributes may be transmitted to the communication management data store.

In some examples, the rendering engine of the communication management application 210 may display, on the display device, a folder (e.g. an inbox folder) in which the communication 212 and the other communication 214 are hosted. The display device may also display the attributes, the resources, and the information to the stakeholder, among others. The stakeholder may have access to the communication 212 and the other communication 214, the attributes, the resources, and the information. The stakeholder may view the communication 212 and the other communication 214 stored in the communication management data store over the display device.

Depending on the viewing mode, the communication management application 210 may allow the stakeholder to manage and modify the communication 212 and the other communication 214. In a further embodiment, the stakeholder may be allowed to create a profile on the communication management application 210 for access to the communication 212 and the other communication 214 in the communication management data store. In some examples, the stakeholder may be allowed to interact with the controls 208 to edit the communication 212 and the other communication 214.

In an example, the rendering engine of the communication management application 210 may detect an input 206 to generate a note related to the communication 212. The input 206 may include a press and hold action, a swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others. The communication management application 210 may provide, on the display device, a note interface to capture the note.

Figure 3A:
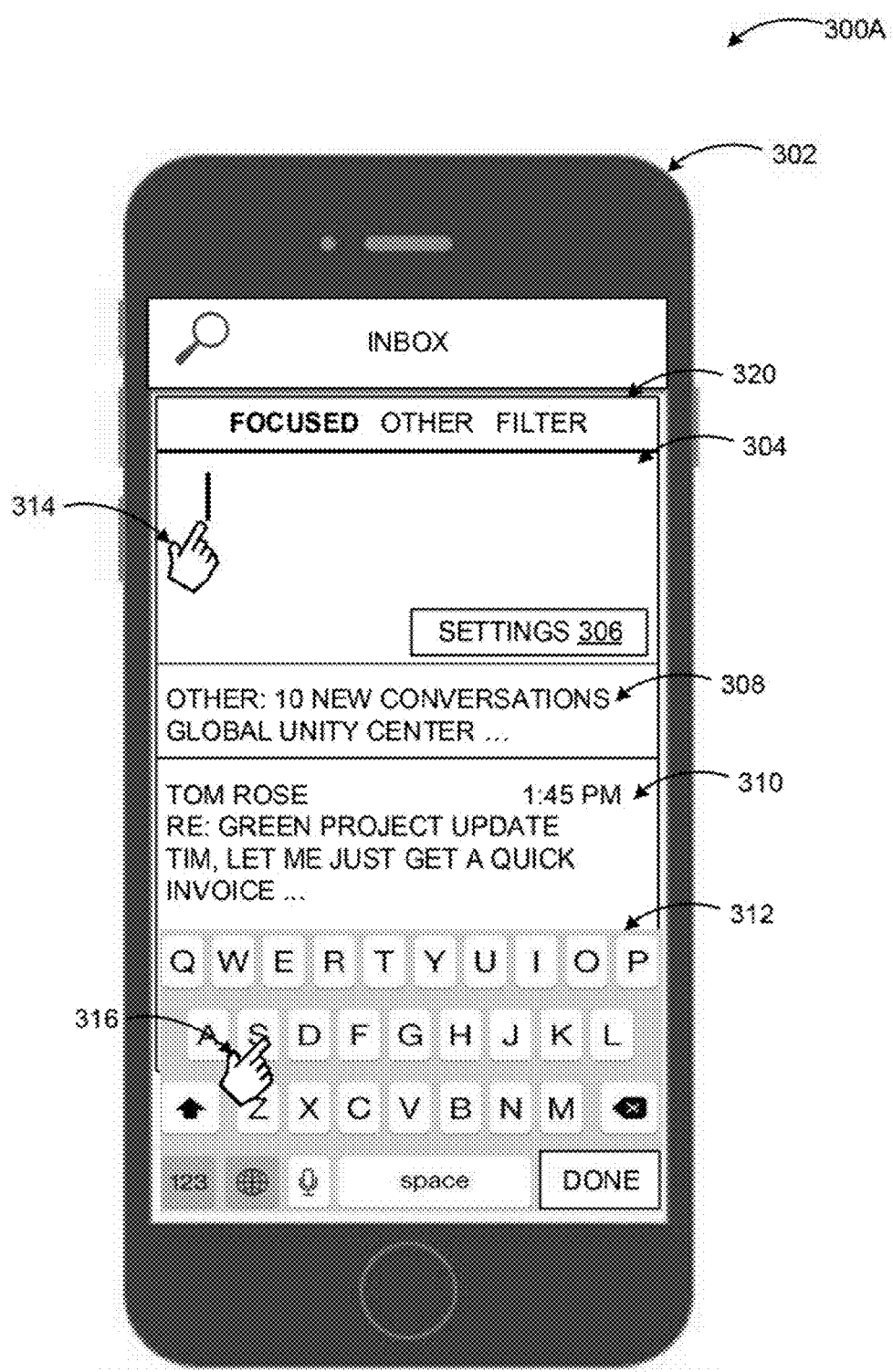
FIG. 3A and FIG. 3B are display diagrams illustrating a method to create notes related to communications on an example note interface, according to embodiments.
Figure 3B:
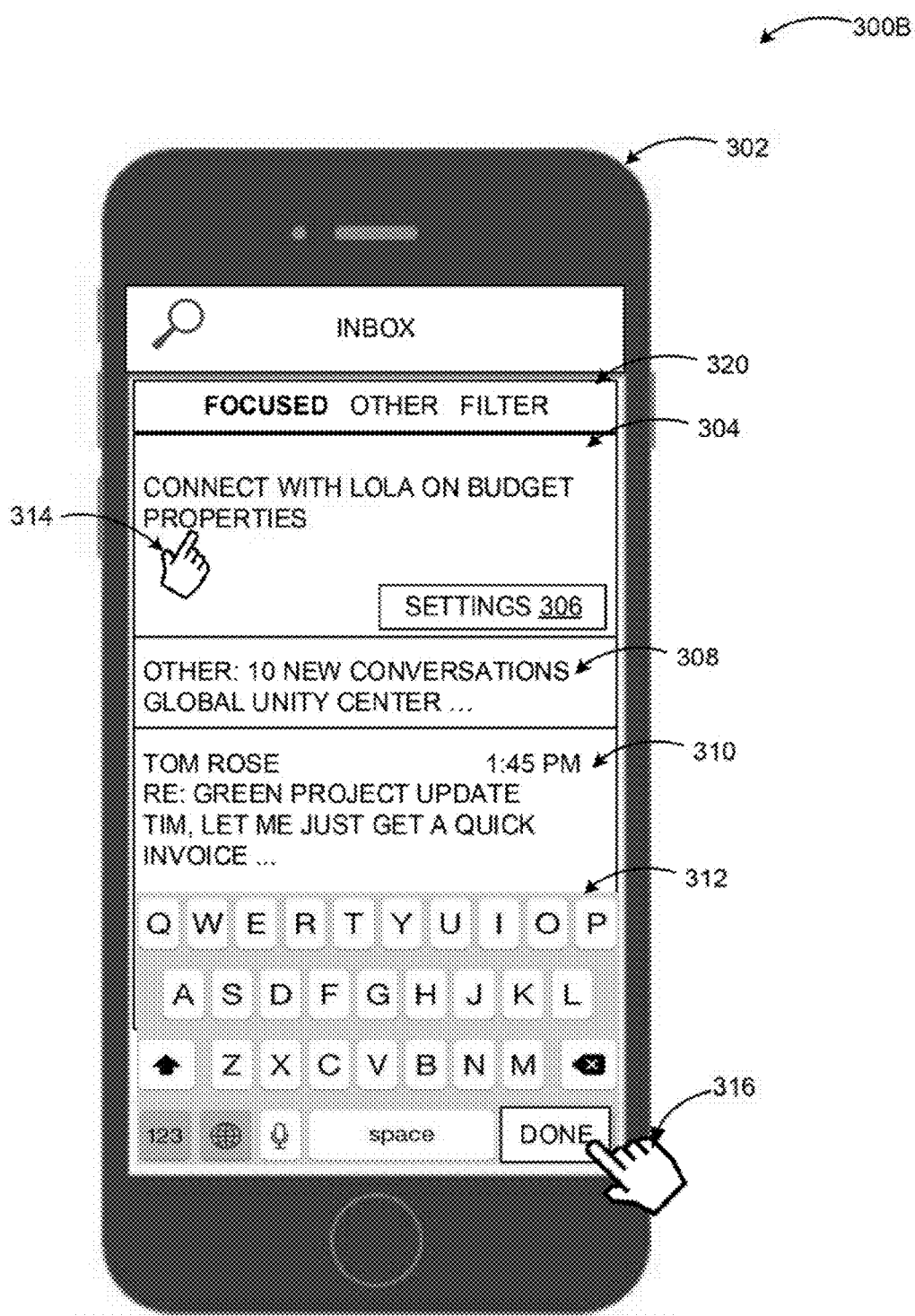

FIG. 3A and FIG. 3B are display diagrams illustrating a method to create notes related to communications on an example note interface, according to embodiments.

In a diagram 300A, a computing device 302 may provide a communication management application 320 to a stakeholder. The communication management application 320 may retrieve a communication 308 and another communication 310 from a communication management server. Upon association of the communication management application 320 with the communication management server, the communication management application 320 may import the communication 308 and the other communication 310. The communication management application 320 may import attributes, resources, and information associated with the communication 308 and the other communication 310, among other properties.

In examples, the communication 308 and the other communication 310 may be imported into a folder (e.g. an inbox folder) based on default properties associated with the communication 308 and the other communication 310. The communication management application 320 may detect an edit to the default settings 306 and/or detect an input of stakeholder-defined criteria to modify the default settings 306. In response, the communication management application 320 may display another folder (e.g. a sent folder) and/or different attributes of the communication 308 and the other communication 310 based on the stakeholder-defined criteria.

In examples, the attributes associated with the communication 308 and the other communication 310 may be displayed on the display device. The communication management application 320 may include controls (graphical and/or textual control elements) to allow the stakeholder to perform actions on a selected communication (e.g. the communication 308). The actions may include editing, copying, and scheduling of the resources, associating of attributes, the communication data, and information associated with the selected communication.

In some examples, the attributes associated with the communication 308 and the other communication 310 may be listed in a first status column hierarchically distinguished from the sub-attributes in the same column. Other attributes may be displayed in a second status column and a third status column, following the same hierarchical tree scheme. The first status column, the second status column, and the third status column may be determined based on a selection by the stakeholder of predefined categories or by a stakeholder definition for the categories. An automatic mapping may be performed to translate the attribute fields to the status columns.

In other examples, the mapping of the attributes from attribute fields to the columns in a note interface 304 may occur through a predefined or stakeholder-specific filter. The predefined or stakeholder-specific filter may include rules. A rule may indicate, "place attributes with a deadline this month in the first column." An algorithm facilitating the transformation may evaluate each attribute to determine the column the attribute fits in based on the filter (rule or combination of rules). In response to the evaluation of the attributes, the communication management application 320 may move the attributes to the respective column.

The fields and values associated with the attributes may be displayed visually on the note interface 304. In some examples, the attributes may be displayed using graphical objects and/or textual identification. A coloring scheme or shading scheme may be employed to further identify the sub-attributes. Some or all of the displayed elements on the note interface 304 may be actionable. For example, the communication management application 320 may provide links to controls associated with setting parameters and/or modification parameters of the attributes. In some examples, the links may be associated with modifying view settings of the communication 308 and the other communication 310 and/or the attributes on the note interface 304.

A rendering engine of the communication management application 320 may display, on the display device, the communication 308 and the other communication 310. In examples, a note-editing engine of the communication management application 320 may present information associated with the communication 308 and the other communication 310. The rendering engine may also detect an input to generate a note related to the communication 308. The rendering engine may provide, on the display device, the note interface 304. The rendering engine may detect an input action 314 executed on the note interface 304. In response to the detection of the input action 314, a keyboard 312 may be displayed on the display device. The rendering engine may detect a selection 316 of characters on the keyboard 312. The rendering engine may save the characters in the related communication (e.g. the note). The related communication (e.g. the note) may be displayed on the note interface 304.

In some examples, the note-editing engine of the communication management application 320 may detect a modification of the related communication. The modification may include an edit applied to the deadline and/or an edit applied to the attachment. The note-editing engine may save the modification.

In a diagram 300B, a computing device 302 may provide a communication management application 320 to a stakeholder. A note-editing engine of the communication management application 320 may detect an input action 314 to select characters from a keyboard 312 to input into a related communication on a note interface 304. The note-editing engine may detect a completion of the selection 316 of the characters from a keyboard 312. The note-editing engine may capture and save the note as the related communication associated with the communication 308. The note-editing engine may further display the related communication.

A note rendering engine of the communication management application 320 may detect the association between the communication 308 and the related communication. In a further example, the note rendering engine may detect the association between the communication 308 and the related communication during a first time period and detect another association between the related communication and the other communication 310 during the first time period.

Figure 4A:
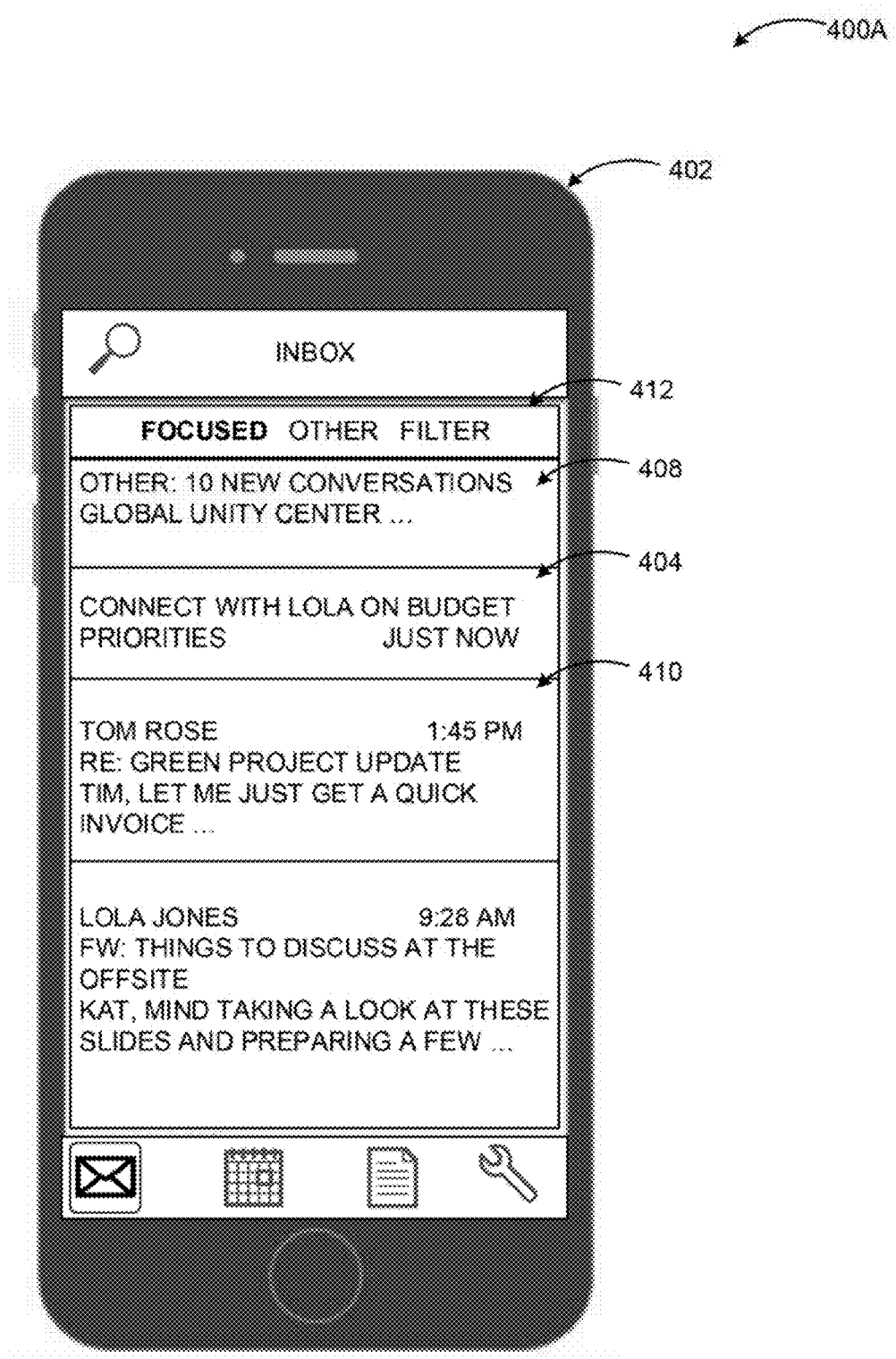
FIG. 4A is a display diagram illustrating a save action associated with notes related to communications on an example note interface, according to embodiments.

FIG. 4A is a display diagram illustrating a save action associated with notes related to communications on an example note interface, according to embodiments.

In a diagram 400A, a computing device 402 may execute a communication management application 412. A note-editing engine of the communication management application 412 may capture a note on a note interface. The note-editing engine may save the note as a related communication 404. The note-editing engine may also save an association of the related communication 404 to a communication 408 during a first time period. The association between the communication 408 and the related communication 404 may allow the stakeholder to recall the related communication 404 at a second time period. For example, the note-editing engine may detect an input on the communication 408 during the second time period. The note-editing engine may display the communication 408 and the related communication 404, as well as the association between the communication 408 and the related communication 404 on the note interface.

In some examples, the note-editing engine may detect a relationship modification of the related communication 404. The note-editing engine may remove the association between the communication 408 and the related communication 404 based on the relationship modification. Another association may be added between the related communication 404 and an additional communication 410 based on the relationship modification.

In other examples, the note-editing engine may prioritize the communications (e.g. the communication 408, the related communication 404, and the additional communication 410) based on attributes associated with the communications (e.g. the communication 408, the related communication 404, and the additional communication 410). The attributes may include a source stakeholder, a priority, a subject matter, and/or a deadline associated with the communications, among others. The note-editing engine may re-order the communications based on a detected re-order input. The re-order input may prioritize the communications using a selected attribute from the attributes.

In other examples, the re-order input may prioritize the communications using one of an ascending order and a descending order. In a further example, the order input may prioritize the communications using the selected attribute from the attributes and one of the ascending order and the descending order. The note-editing engine may detect a repositioning of the communication 408 based on the re-order input and may move the related communication 404 in relation to the communication 408.

In other examples, the note-editing engine may receive a move request to execute a modification of the related communication 404 associated with the communication 408. The modification may disassociate the related communication 404 from the communication 408 and/or may associate the related communication 404 with the additional communication 410, among other actions. The note-editing engine may transmit a notification to the note interface to prompt for an input associated with the modification of the related communication 404. The notification may describe consequences associated with the modification. The consequences may include a disordered list of the communications, among others.

The note-editing engine may receive an approval of the modification. In response to the approval of the modification, the note-editing engine may execute the modification to disassociate the related communication 404 from the communication 408 and to associate the related communication 404 with the additional communication 410. In other examples, the note-editing engine may receive a rejection of the modification. The note-editing engine may dismiss the modification and may maintain an association between the communication 408 and the related communication 404.

In further examples, the note-editing engine may detect the related communication 404 as being additionally allocated to the additional communication 410. The note-editing engine may identify the attributes of the communications. In response to the identification of the attributes, the note-editing engine may compare the attributes of the communication 408 to the attributes of the related communication 404 to determine a first relationship. The note-editing engine may also compare the attributes of the related communication 404 to the attributes of the additional communication 410 to determine a second relationship. In some examples, the note-editing engine may compare a first priority associated with the first relationship to a second priority associated with the second relationship.

In response to the comparison, the note-editing engine may assign a first weighted value to the first priority and a second weighted value to the second priority. The first weighted value and the second weighted value may be based on default attributes. For example, the communication management application 412 may assign a weighted value of one to a source stakeholder attribute associated with the communications, a weighted value of two to a subject matter attribute associated with the communications, a weighted value of three to a priority attribute associated with the communications, and a weighted value of four to a deadline attribute associated with the communications. In examples, the first weighted value may include the source stakeholder attribute and the subject matter attribute, totaling a weighted value of three. In another example, the second weighted value may include the source stakeholder attribute and the priority attribute, totaling a weighed value of four. In this example, the second weighted value is larger than the first weighed value, making the second weighed value more significant than the first weighed value.

In other examples, the first weighted value and the second weighted value may be modified in response to receiving stakeholder-defined criteria. For example, the modification may edit the weighed value of the source stakeholder attribute based on an identification of the source stakeholder. For example, the modification may edit the weighted value of one to a weighed value of four for the source stakeholder that is a boss, whereas the weighed value of one for the source stakeholder that is a co-worker may be maintained.

In further examples, the first weighted value and the second weighted value may be determined by using one or more algorithms (e.g. a weighted majority algorithm, an algorithm implementing a nearest neighbor method, a label dependent feature weighing algorithm, a randomized weighted majority algorithm, a learning algorithm, etc.). The learning algorithm may analyze a history of assigned weighed values during a first time period to determine the first weighted value and the second weighted value during a second time period.

The note-editing engine may determine the first weighted value as being larger than the second weighed value. In response, the note-editing engine may maintain the association between the communication 408 and the related communication 404 and may remove the association between the related communication 404 and the additional communication 410. In other examples, the note-editing engine may determine the first weighted value as being less than the second weighed value. In response, the note-editing engine may maintain the association between the related communication 404 and the additional communication 410 and may remove the association between the communication 408 and the related communication 404.

Figure 4B:
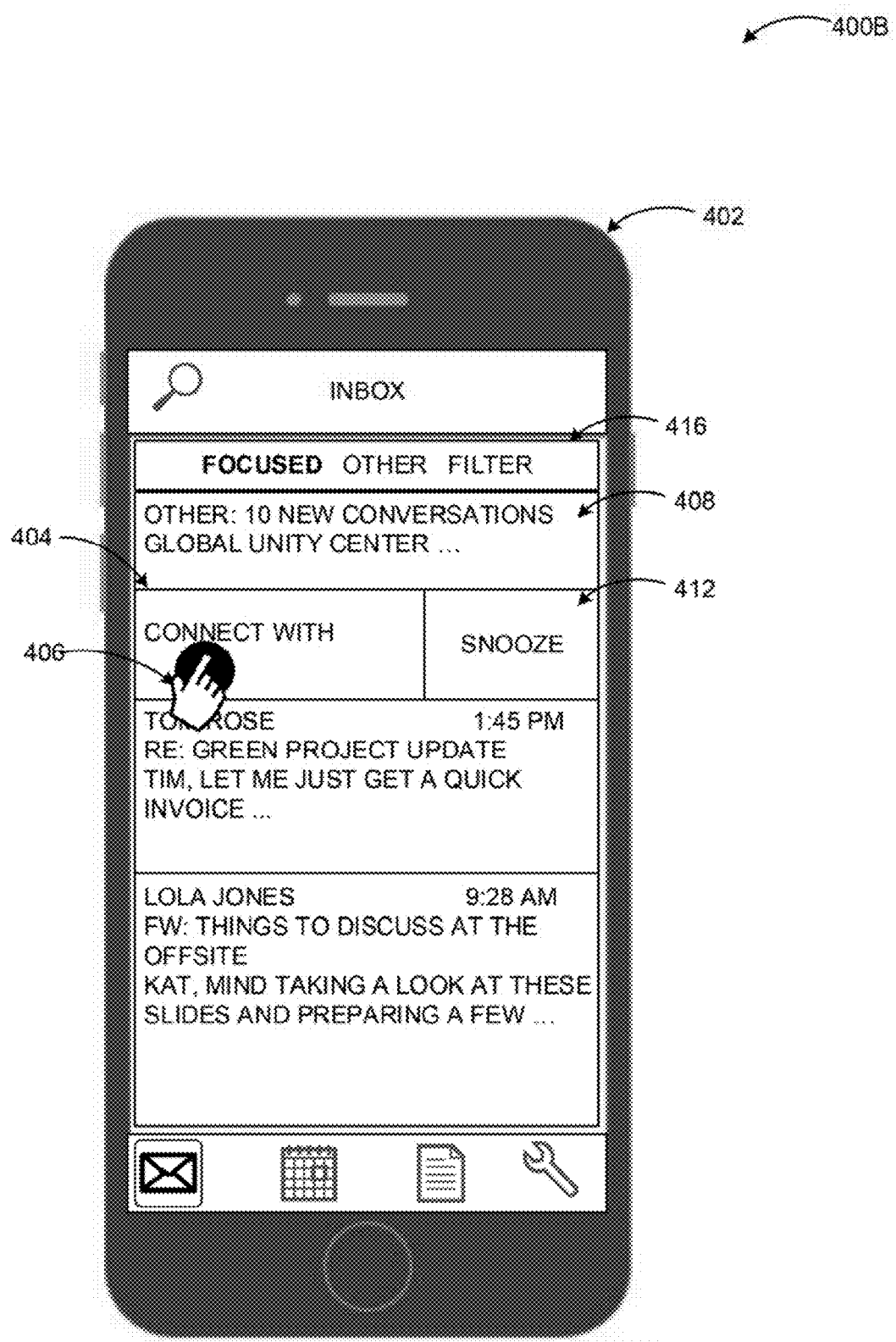
FIG. 4B is a display diagram illustrating reminders of notes related to communications on an example note interface, according to embodiments.

FIG. 4B illustrates a display diagram illustrating reminders of notes related to communications on an example note interface, according to embodiments.

In a diagram 400B, a computing device 402 may execute a communication management application 416. A note-editing engine of the communication management application 416 may display a captured related communication 404. A communication 408 may include an association to the related communication 404.

In an example, the note-editing engine may detect a transmission input 406 to transmit the related communication 404 to an email address associated with a target stakeholder, an online calendar invite associated with the target stakeholder, a social networking site associated with the target stakeholder, and/or a professional networking site associated with the target stakeholder, among others. The note-editing engine may provide the related communication 404 to a communication module for the transmission.

In a further example, the note-editing engine may detect the transmission input 406 to transmit the related communication 404 to an email address, an online calendar invite, a social networking site, and/or a professional networking site of a group. The group may include a source stakeholder, a target stakeholder, and another stakeholder, among others. The note-editing engine may transmit the related communication 404 based on the transmission input 406.

In some examples, a rendering engine of the communication management application 416 may detect and present information associated with the related communication 404. The communication management application 416 may enable the stakeholder to modify presentation aspects associated with the communication 408 and/or the information to identify and distinguish the information and/or the communication 408 from the related communication 404. The information may include a deadline and/or an attachment, among others. A task may be created based on the deadline, for example. The task may include a "remind a day before the deadline," "remind an hour before the deadline," or "remind ten minutes before the deadline," among other examples. The note-editing engine may detect an input 412 executed on the related communication 404 to silence the task, mark the task as complete, and/or edit the deadline associated with the task.

In other examples, the rendering engine may detect another input to generate another note from the communications. The note interface may be provided to capture the other note. The note-editing engine may capture the other note through the note interface and save the other note as another communication that is unrelated to the communication 408. The other communication may be provided to the rendering engine for rendering along with the communications. In one example scenario, a user may be reviewing email and receive a call reminding him/her to pick up milk on the way home. The user may use the note-capturing interface on their email application (executed by their desktop computer) to create a reminder/note to pick up milk. The user may configure the application to prompt them before they pass the grocery store on the way home. Later that day on the drive home, as the user approaches the grocery store that they typically drive by, the user's smartwatch may vibrate and/or display an alert, prompting them to stop by the store to pick up milk.

In examples, the communication management application 416 may include controls (e.g., graphical and/or textual control elements) to allow the stakeholder to perform actions on a selected communication (e.g., the communication 408 or the other communication). The actions may include editing, copying, and scheduling of the resources, association of attributes, and information associated with the selected communication. In some examples, the actions may include enrichment actions to augment the selected communication. The enrichment actions may include, for example, an addition of a graphic, an audio file, a video file, a textual file, a hashtag, a label, a color, a priority, and a reminder, among others, to the selected communication. Further, the enrichment actions may be detected by input gestures (e.g. a quick action, a swipe action, and a press and hold action, etc.) during the creation of the communication. In further examples, the enrichment actions may include creating and/or modifying associations between the communication 408, the other communication, and the related communication 404.

In another example, the note-editing engine of the communication management application 416 may save the related communication 404 to a note platform (e.g., a hosted service executed over servers or another application executed on a single computing device, among others). The note platform may act as a repository for communications. For example, the note platform may include a list of communications (e.g. the communication 408 and the related communication 404). The communication management application 416, executed by the computing device 402, may save the communication 408 to the note platform. Another application, executed by another computing device, may save the related communication 404 to the note platform.

The example scenarios and schemas in FIG. 1 through FIG. 4B are shown with specific components, data types, and configurations. Embodiments are not limited to systems according to these example configurations. Creating notes related to communications may be implemented in configurations employing fewer or additional components in applications and user interfaces. Furthermore, the example schema and components shown in FIG. 1 through FIG. 4B and their subcomponents may be implemented in a similar manner with other values using the principles described herein.

Figure 5:
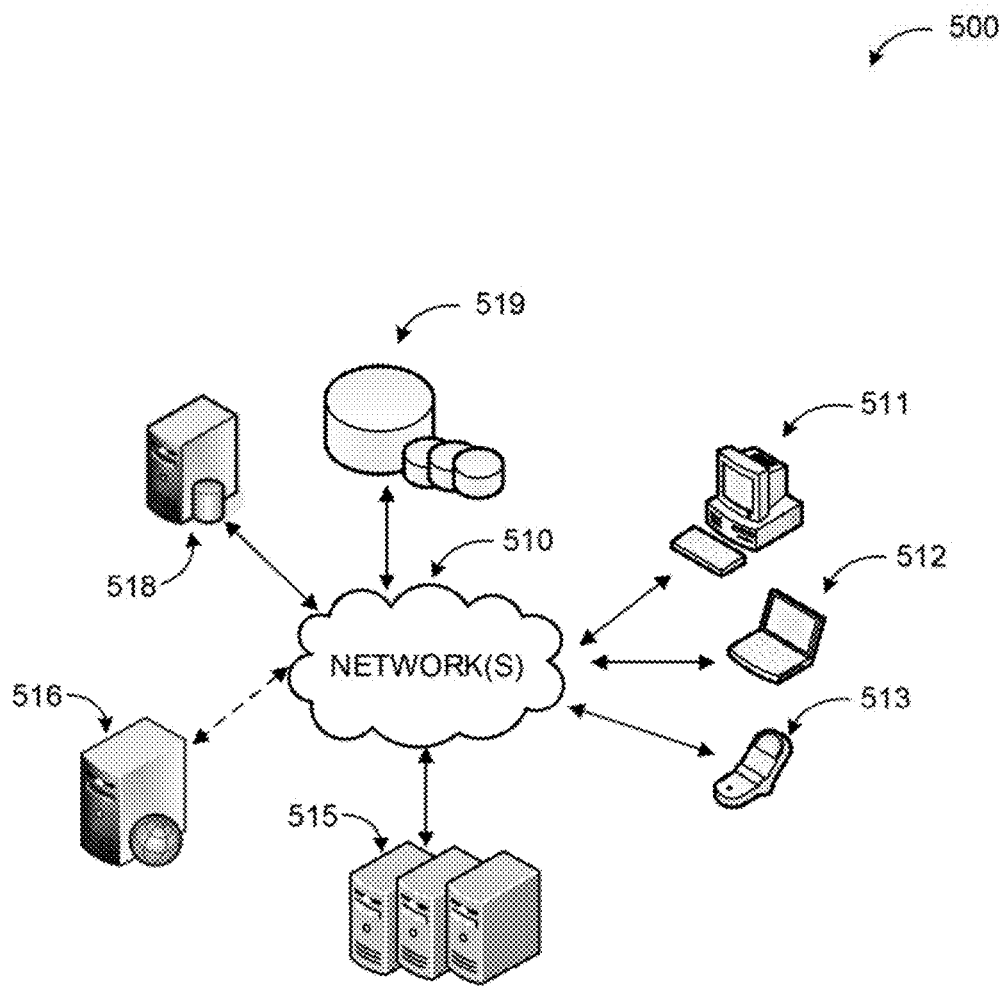
FIG. 5 is a simplified networked environment, where a system according to embodiments may be implemented.

FIG. 5 is a simplified networked environment, where a system according to embodiments may be implemented.

As shown in a diagram 500, notes may be captured on a note interface of a computing device. The computing device may execute a communication management application. In examples, a communication management service may be implemented via software executed over the servers 514. The platform may communicate with client applications on individual computing devices such as a smart phone 513, a mobile computer 512, or desktop computer 511 ('client devices') through network(s) 510. The servers 514, may include one or more communication management servers 516, where at least one of the one or more communication management servers 516 may be configured to execute one or more applications (i.e. the communication management application) associated with a communication management service. In other examples, the communication management service may be provided by a third party service or may include a web application. The communication management service may store data associated with note data in a data store 519 directly or through a database server 518. Client applications executed on client devices 511-513 may be enabled to receive the note data and render the note interface displaying information associated with captured notes.

Client applications executed on any of the client devices 511-513 may facilitate communications via application(s) executed by the one or more communication management servers 516, or on an individual communication management server. An application, such as the communication management application, may display communications and may detect an input to generate a note related to a communication from the communications. The communication management application may provide a note interface to capture the note and may capture the note on the note interface. The note may be saved as a related communication associated with the communication. The communication management application may display the related communication. The communication management application may store the note data associated with the notes in the data store 519 directly or through database server 518.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the nodes described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to further enhance stakeholder interaction between information associated with the notes and the note interface.

Many other configurations of computing devices, applications, data sources, and data distribution systems may be employed for creating notes related to communications. Furthermore, the networked environments discussed in FIG. 5 are for illustration purposes only. Embodiments are not limited to the example applications, modules, or processes.

Figure 6:
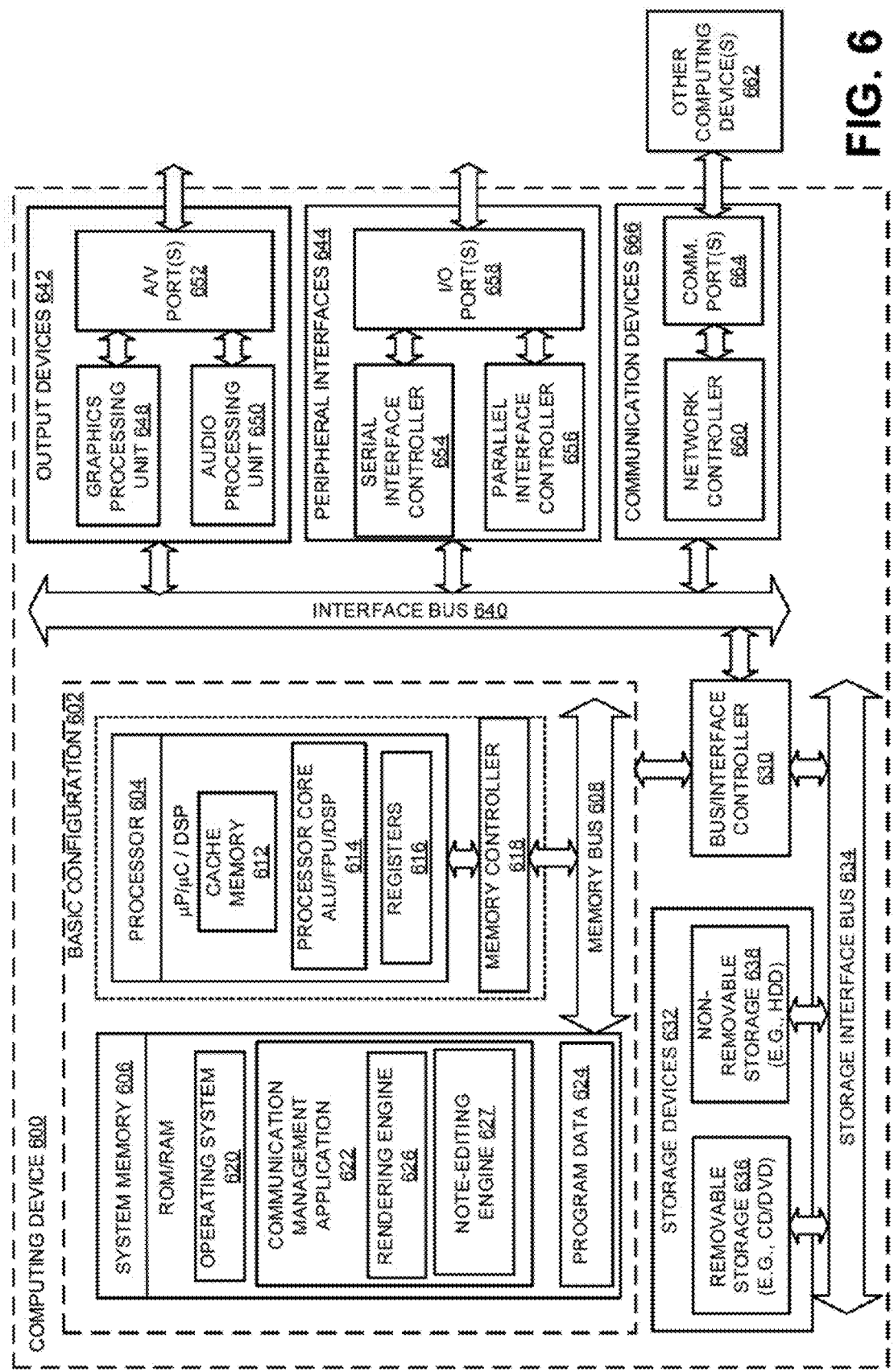
FIG. 6 is a block diagram of an example computing device, which may be used for creating notes related to communications, according to embodiments.

FIG. 6 is a block diagram of an example computing device, which may be used for creating notes related to communications, according to embodiments.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication management application 622, and a program data 624. The communication management application 622 may include a rendering engine 626 and a note-editing engine 627. The rendering engine 626 may display, on a display device associated with the computing device 600, communications. The rendering engine 626 may detect an input to generate a note related to a communication from the communications and may provide, on the display device, a note interface to capture the note. The note-editing engine 627 may capture the note on the note interface and may save the note as a related communication associated with the communication. The note-editing engine 627 may display the related communication.

Components of the communication management application 622 (such as the note interface) may also be displayed on the display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a note interface of the communication management application 622, displayed by the touch based device. The program data 624 may also include, among other data, note data, and information related to the notes, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the example basic configuration 602 via the bus/interface controller 630. Some of the one or more output devices 642 include a graphics processing unit 648 and an audio processing unit 650, which may be configured to communicate to various external devices such as a display or speakers via one or more AN ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for creating notes related to communications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
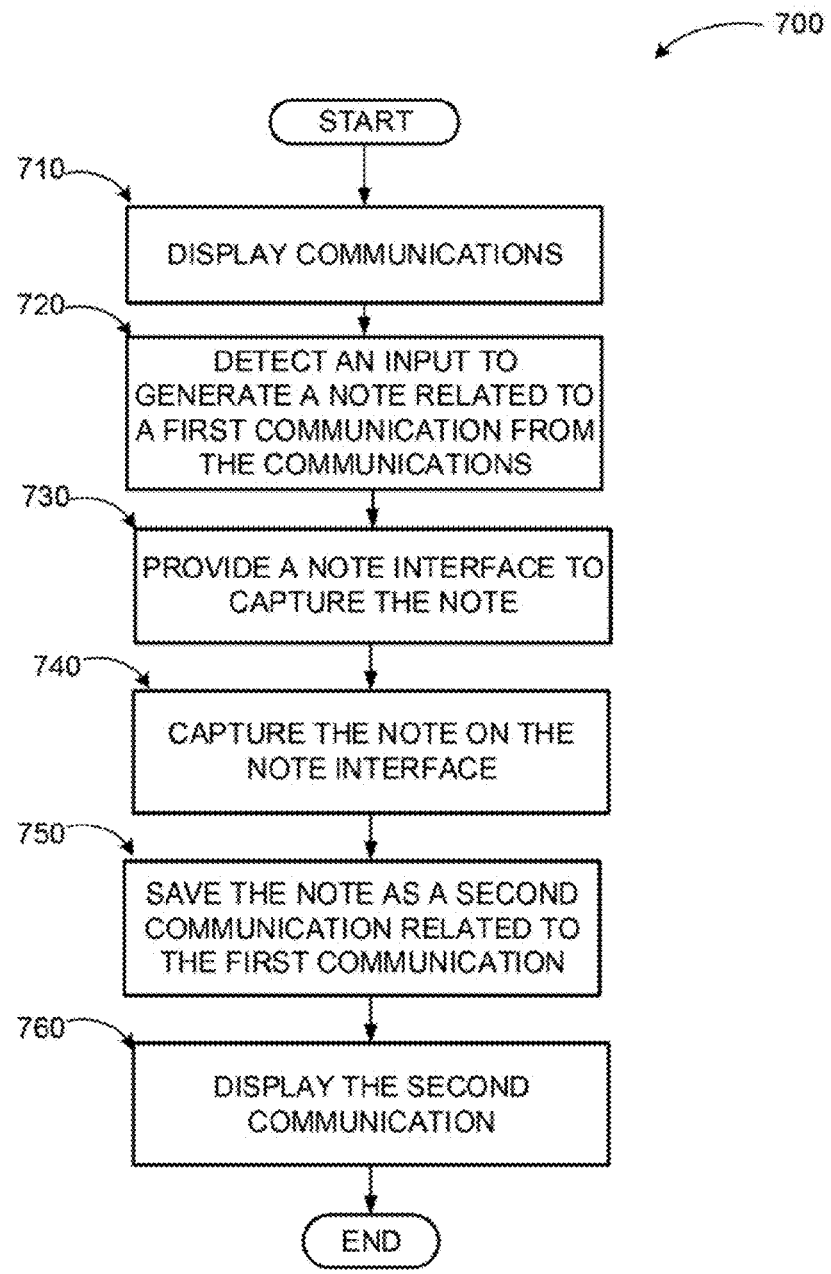
FIG. 7 is a logic flow diagram illustrating a process for creating notes related to communications, according to embodiments.

FIG. 7 is a logic flow diagram illustrating a process for creating notes related to communications, according to embodiments.

A process 700 may be implemented on a computing device, such as the computing device 600, or with another system. As described, a stakeholder may be allowed to interact with a communication management application through an input device or a touch enabled display component of the computing device 600. The computing device 600 may include a display device to provide a note interface of the communication management application to the stakeholder.

The process 700 begins with operation 710, where communications may be displayed. The communications may include emails, online calendar invites, attachments associated with the emails, and text messages, among others. At operation 720, the communication management application may detect an input to generate a note related to a communication from the communications. The input may include a press and hold action, a swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others.

At operation 730, the communication management application may provide a note interface to capture the note. At operation 740, the communication management application may capture the note on the note interface. At operation 750, the communication management application may save the note as a related communication associated with the communication. The communication management application may also present information associated with the related communication. The information may include a deadline and/or an attachment, among others. The communication management application may distinguish the information with a textual scheme, a graphical scheme, an audio scheme, an animation scheme, a coloring scheme, a highlighting scheme, and/or a shading scheme, among others.

At operation 760, the communication management application may display the related communication. In some examples, the communication management application may receive a move request to execute a modification of the related communication associated with the communication. The modification may disassociate the related communication from the communication and may associate the related communication with an additional communication. The communication management application may transmit a notification to the note interface to prompt for an input associated with the modification of the related communication, wherein the notification includes one or more consequences associated with the modification. The communication management application may also, in response to receiving an approval of the modification, execute the modification to disassociate the related communication from the communication and to associate the related communication with the additional communication. In further examples, the communication management application may, in response to receiving a rejection of the modification, dismiss the modification and maintain an association between the communication and the related communication.

Embodiments enable, as discussed herein, enrichment of notes, which may include many aspects such as adding a file or picture, setting a reminder data, setting a person or location based reminder, adding a label or hashtag, scheduling the note on the calendar, etc. Enrichment may also include creating and modifying the associations between the notes themselves and other email communications (linking, unlinking, etc.). Moreover, enrichment may occur during creation as well as any time after creation of the note. The note may or may not be related to the communication, that is, a note may be captured and connected to any communication or independent of any communication.

The operations included in process 700 are for illustration purposes. Creating notes related to communications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

A means for creating a note related to communications may be provided, which includes a means for displaying the communications, a means for detecting an input to generate a note related to a first communication from the communications, a means for providing a note interface to capture the note, a means for capturing the note on the note interface, a means for saving the note as a second communication related to the first communication, and a means for displaying the second communication along with the communications.

According to some embodiments, computing devices for creating a note related to communications are described. An example computing device may include a display device, a memory, and processors coupled to the memory and the display device. The processors may execute a communication management application in conjunction with instructions stored in the memory. The communication management application may include a rendering engine and a note-editing engine. The rendering engine may be configured to display, on the display device, the communications, detect an input to generate a note related to a first communication from the communications, and provide, on the display device, a note interface to capture the note. The note-editing engine may be configured to capture the note on the note interface, save the note as a second communication related to the first communication, and provide the second communication to the rendering engine for rendering along with the communications.

According to some examples, the note-editing engine may be further configured to present information associated with the second communication. The note-editing engine may be further configured to distinguish the information with a textual scheme, a graphical scheme, an audio scheme, an animation scheme, a coloring scheme, a highlighting scheme, and/or a shading scheme. In examples, the note-editing engine may be further configured to detect a modification of the second communication and save the modification of the second communication. The information may include a deadline and/or an attachment. The modification may include an edit applied to the deadline and/or an edit applied to the attachment.

According to other examples, the rendering engine may be further configured to detect another input to generate another note from the communications and provide, on the display device, the note interface to capture the other note. The rendering engine may transmit the other note to the note-editing engine. The note-editing engine may be further configured to capture the other note on the note interface and save the other note as a third communication that is unrelated to the first communication.

According to some embodiments, the note-editing engine may be further configured to detect a relationship modification of the second communication, remove the association between the first communication and the second communication based on the relationship modification, and add another association between the second communication and a third communication based on the relationship modification. In further embodiments, the note-editing engine may be further configured to detect a transmission input to transmit the second communication to an email address associated with a target stakeholder, an online calendar invite associated with the target stakeholder, a social networking site associated with the target stakeholder, and/or a professional networking site associated with the target stakeholder. The second communication may be provided to a communication module of the computing device for the transmission.

According to additional embodiments, the note-editing engine may be further configured to prioritize the communications based on attributes associated with the communications and re-order the communications based on a re-order input. The attributes may include a source stakeholder, a priority, a subject matter, and/or a deadline, among others. The re-order input may prioritize the communications using a selected attribute from the attributes and an ascending order or a descending order. In some examples, the note-editing engine may be further configured to detect a repositioning of the first communication based on the re-order input and move the second communication in relation to the first communication.

According to further embodiments, the note-editing engine may be further configured to receive a move request to apply a modification of the second communication associated with the first communication and transmit a notification to the note interface to prompt for an input associated with the modification of the second communication. The modification may disassociate the second communication from the first communication and associate the second communication with a third communication. The notification may describe consequences associated with the modification. In response to receiving an approval of the modification, the note-editing engine may be further configured to apply the modification to disassociate the second communication from the first communication and to associate the second communication with the third communication. In response to receiving a rejection of the modification, the note-editing engine may be further configured to dismiss the modification and maintain an association between the first communication and the second communication.

According to some embodiments, methods for creating a note related to communications are described. An example method may include process steps, such as, displaying the communications, detecting an input to generate a note related to a first communication from the communications, providing a note interface to capture the note, capturing the note on the note interface, saving the note as a second communication related to the first communication, and displaying the second communication along with the communications. The communications may include emails, online calendar invites, attachments associated with the emails, and/or text messages, among others.

According to other embodiments, additional process steps may include detecting the second communication as allocated to a third communication, identifying attributes of the communications, comparing the attributes of the first communication to the attributes of the second communication to determine a first relationship and comparing the attributes of the second communication to the attributes of the third communication to determine a second relationship. The attributes may include a source stakeholder, a priority, a subject matter, and/or a deadline, among others.

According to other embodiments, additional process steps may include comparing a first priority associated with the first relationship to a second priority associated with the second relationship and assigning a first weighted value to the first priority and a second weighted value to the second priority. The example method may further include additional process steps, such as, determining the first weighted value as being larger than the second weighed value, maintaining an association between the first communication and the second communication, and removing the association between the second communication and the third communication.

According to other embodiments, additional process steps may include determining the first weighted value as being less than the second weighed value, maintaining an association between the second communication and the third communication, and removing the association between the first communication and the second communication. In other examples, the method may further include steps for detecting a transmission input to transmit the second communication to an email address, an online calendar invite, a social networking site, and/or a professional networking site of a group and transmitting the second communication based on the transmission input. The group may include a source stakeholder, a target stakeholder, and/or another stakeholder, among others. the input may include a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others.

According to some examples, computer-readable memory devices with instructions stored thereon for creating a note related to communications may be provided. An example computer-readable memory device with instructions stored thereon for creating a note related to communications may include displaying the communications, detecting an input to generate a note related to a first communication from the communications, providing a note interface to capture the note, capturing the note on the note interface, saving the note as a second communication related to the first communication, and displaying the second communication along with the communications. The communication may include emails, online calendar invites, attachments associated with the emails, and/or text messages, among others.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for creating a note related to communications, the computing device comprising:
 a display device;
 a memory; and
 one or more processors coupled to the memory and the display device, the one or more processors executing a communication management application in conjunction with instructions stored in the memory, wherein the communication management application includes:
 a rendering engine configured to:
  display, on the display device, the communications;
  detect an input to generate a note related to a first communication from the communications; and
  provide, on the display device, a note interface to capture the note; and
 a note-editing engine configured to:
  capture the note on the note interface;
  save the note as a second communication related to the first communication;
  provide the second communication to the rendering engine for rendering along with the communications;
  detect the second communication as allocated to a third communication;
  identify one or more attributes of the first communication, the second communication, and the third communication, wherein the one or more attributes include a source stakeholder, a priority, a subject matter, or a deadline;
  compare the one or more attributes of the first communication to the one or more attributes of the second communication to determine a first relationship; and
  compare the one or more attributes of the second communication to the one or more attributes of the third communication to determine a second relationship.

2. The computing device of claim 1, wherein the note-editing engine is further configured to:
 present information associated with the second communication, wherein the information includes one or more of a deadline and an attachment;
 distinguish the information with one or more of a textual scheme, a graphical scheme, an audio scheme, an animation scheme, a coloring scheme, a highlighting scheme, and a shading scheme;
 detect a modification of the second communication, wherein the modification includes one or more of an edit applied to the deadline and an edit applied to the attachment; and
 save the modification of the second communication.

3. The computing device of claim 1, wherein the rendering engine is further configured to:
 detect another input to generate another note from the communications;
 provide, on the display device, the note interface to capture the other note; and
 transmit the other note to the note-editing engine, wherein the note-editing engine is configured to capture the other note on the note interface and save the other note as the third communication that is unrelated to the first communication.

4. The computing device of claim 1, wherein the note-editing engine is further configured to:
 detect a relationship modification of the second communication;
 remove an association established between the first communication and the second communication based on the relationship modification; and
 add another association between the second communication and the third communication based on the relationship modification.

5. The computing device of claim 1, wherein the note-editing engine is further configured to:

detect a transmission input to transmit the second communication to one or more of: an email address associated with a target stakeholder, an online calendar invite associated with the target stakeholder, a social networking site associated with the target stakeholder, and a professional networking site associated with the target stakeholder; and provide the second communication to a communication module for the transmission.

6. The computing device of claim 1, wherein the note-editing engine is further configured to:

prioritize the communications based on the one or more attributes associated with the communications; and re-order the communications based on a re-order input, wherein the re-order input prioritizes the communications using a selected attribute from the one or more attributes and one or more of an ascending order and a descending order.

7. The computing device of claim 6, wherein the note-editing engine is further configured to:

detect a repositioning of the first communication based on the reorder input; and move the second communication in relation to the first communication.

8. The computing device of claim 1, wherein the note-editing engine is further configured to:

receive a move request to apply a modification of the second communication associated with the first communication, wherein the modification disassociates the second communication from the first communication and associates the second communication with the third communication; and transmit a notification to the note interface to prompt for an input associated with the modification of the second communication, wherein the notification describes one or more consequences associated with the modification.

9. The computing device of claim 8, wherein the note-editing engine is further configured to:

in response to receiving an approval of the modification, apply the modification to disassociate the second communication from the first communication and to associate the second communication with the third communication.

10. The computing device of claim 8, wherein the note-editing engine is further configured to:

in response to receiving a rejection of the modification, dismiss the modification; and maintain an association between the first communication and the second communication.

11. A method executed in a computing device for creating a note related to communications, the method comprising:

displaying the communications, wherein the communications include one or more of emails, online calendar invites, attachments associated with the emails, and text messages;

detecting an input to generate a note related to a first communication from the communications;

providing a note interface to capture the note;

capturing the note on the note interface;

saving the note as a second communication related to the first communication;

displaying the second communication along with the communications;

detecting the second communication as allocated to a third communication;

identifying one or more attributes of the first communication, the second communication, and the third communication, wherein the one or more attributes include a source stakeholder, a priority, a subject matter, or a deadline;

comparing the one or more attributes of the first communication to the one or more attributes of the second communication to determine a first relationship; and comparing the one or more attributes of the second communication to the one or more attributes of the third communication to determine a second relationship.

12. The method of claim 11, further comprising:

comparing a first priority associated with the first relationship to a second priority associated with the second relationship; and assigning a first weighted value to the first priority and a second weighted value to the second priority.

13. The method of claim 12, further comprising:

determining the first weighted value as being larger than the second weighed value;

maintaining an association between the first communication and the second communication; and removing the association between the second communication and the third communication.

14. The method of claim 12, further comprising:

determining the first weighted value as being less than the second weighed value;

maintaining an association between the second communication and the third communication; and removing the association between the first communication and the second communication.

15. The method of claim 11, further comprising:

detecting a transmission input to transmit the second communication to one or more of: an email address, an online calendar invite, a social networking site, and a professional networking site of a group, wherein the group includes the source stakeholder, a target stakeholder, and another stakeholder; and transmitting the second communication based on the transmission input.

16. The method of claim 11, wherein the input includes one or more of a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and a time based input.

17. A hardware device having instructions stored thereon for creating a note related to communications, the instructions comprising:

displaying the communications, wherein the communications include one or more of emails, online calendar invites, attachments associated with the emails, and text messages;

detecting an input to generate a note related to a first communication from the communications;

providing a note interface to capture the note;

capturing the note on the note interface;

saving the note as a second communication related to the first communication;

displaying the second communication along with the communications;

detecting the second communication as allocated to a third communication;

identifying one or more attributes of the first communication, the second communication, and the third communication, wherein the one or more attributes include a source stakeholder, a priority, a subject matter, or a deadline;

comparing the one or more attributes of the first communication to the one or more attributes of the second communication to determine a first relationship; and comparing the one or more attributes of the second communication to the one or more attributes of the third communication to determine a second relationship.

18. The hardware device of claim 17, wherein the instructions further comprise:

comparing a first priority associated with the first relationship to a second priority associated with the second relationship; and detecting a first weighted value associated with the first priority and a second weighted value associated with the second priority.

19. The hardware device of claim 18, wherein the instructions further comprise:

determining the first weighted value as being less than the second weighed value;

removing an association established between the first communication and the second communication; and generating another association between the second communication and the third communication.

* * * * *